Figures 1, 2:
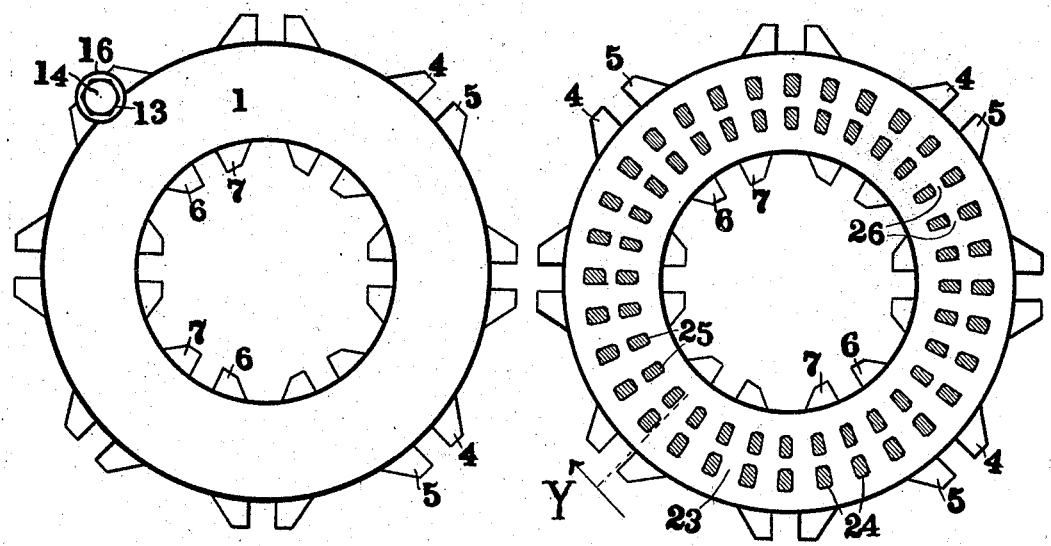

J. K. WILLIAMS.
MOLD.
APPLICATION FILED APR. 18, 1908.

911,861.

Patented Feb. 9, 1909.

WITNESSES
Glenara Fox
Evelyn Blinn

INVENTOR
John K. Williams
C. E. Humphrey
BY
ATTORNEY.

UNITED STATES PATENT OFFICE.

JOHN K. WILLIAMS, OF AKRON, OHIO, ASSIGNOR OF ONE-HALF TO THE WILLIAMS FOUNDRY AND MACHINE COMPANY, OF AKRON, OHIO, A CORPORATION OF OHIO.

MOLD.

No. 911,861.      Specification of Letters Patent.      Patented Feb. 9, 1909.

Application filed April 18, 1908. Serial No. 427,883.

*To all whom it may concern:*

Be it known that I, JOHN K. WILLIAMS, a citizen of the United States, residing at Akron, in the county of Summit and State of Ohio, have invented new and useful Improvements in Molds, of which the following is a specification.

This invention relates to molds for containing articles, more especially vehicle tires wholly or in part composed of rubber, during the vulcanization thereof, and the object thereof is to produce a mold provided with a plurality of parts, said parts comprising end and intermediate sections, said end sections being each made with grooves formed in one of the faces thereof so constructed that when clamped together they will constitute a complete mold, said intermediate sections being so formed that any number thereof may be interposed between two end sections, each intermediate section being provided with grooves on their opposite faces so that when the intermediate sections are in abutting relation with each other or with one of the end sections they will form therewith complete molds, whereby the capacity of the device may be extended indefinitely within reasonable limits by the interposition of the intermediate sections between suitable end or closing sections. From the foregoing it will be seen that by the employment of a pair of suitable end sections for closing the top and bottom of the mold, said sections being provided with grooves in one face thereof, any number of units comprising intermediate sections may be placed between said end sections for increasing the capacity of the device, each intermediate section, as before stated, having in its opposite faces grooves forming one-half of a mold cavity of a proper shape and size to vulcanize the article to be introduced therein.

A further object of this invention is to form the sections with means whereby they may be brought into and separated from abutting relation with each other to form when united an integral article and further provided with means for securely clamping them together.

A further object of this invention is to so construct the sections that the thickness of the metal surrounding the cavities of the molds will be reduced as much as possible, consistent with safety, to the end that the heat required to vulcanize the article may radiate thereto easily and quickly and as equally as possible, so that all portions of the tire will be cured in substantially the same length of time, also decreasing the length of time required for the vulcanization of the article, by reason of reduction in thickness of the metal surrounding the mold cavities, thereby shortening the time required for the curing of the articles contained in the device embodying this invention.

Other advantages constituting objects of this invention will more fully appear in the subjoined description.

A practical embodiment of this invention is illustrated in the accompanying drawings in which similar reference numerals indicate like parts in the different figures.

In the drawings, Figure 1 is a plan view of a mold formed in accordance with this invention. Fig. 2 is a sectional view of a mold such as is shown in Fig. 1 on line X of Fig. 3, and, Fig. 3 a view in side elevation, enlarged, of the mold shown in Fig. 1 with portions thereof broken away on line Y of Fig. 2 to better illustrate the interior construction thereof.

Referring to the drawings in detail, 1 and 2 denote the top and bottom mold sections respectively. These sections are identical and consist of metallic rings each having in one face an annular groove 3 of a shape which it is desired to impart to the vulcanized article. These sections are provided with an outwardly-extending series of pairs of individual lugs, the members of each pair being referred to by the reference numerals 4 and 5. The members 1 and 2 are further provided interiorly with a second series of inwardly-projecting pairs of lugs, the members thereof referred to by the numerals 6 and 7. The series of lugs 4 and 5 may or may not register with the series of lugs 6 and 7, but the pairs of each series of lugs on the member 1 will be in vertical alinement with the corresponding series of lugs on the members 2.

In order to make the walls of the members 1 and 2 which surround the grooves therein thinner, the outer faces of these members are exteriorly beveled as at 8 and interiorly beveled as at 9. The inner or abutting faces of the members 1 and 2 are preferably provided with grooves 10 surrounding but spaced apart from the grooves 3 for a purpose to be later described.

If it is desired to vulcanize a hollow article which requires the use of a core, suitable grooves 11 are cut in the inner or abutting faces of the members 1 and 2, which, when the molds are united, form a suitable cavity for the reception of the flange of a core 12 for effectually securing the latter in position. When it is desired to utilize this device as a single-cavity mold, some article, as for example, a rubber tire, which has been built up in an unvulcanized condition on a core 12 is laid in the groove 3 of the member 2 with the flange of the core extending into the groove 11. The member 1 is then superposed on the member 2 in such a manner that the grooves 3 of both members will be in registering relation, thereby positioning the same. The two members 1 and 2 are then clamped together by means of bolts 13 provided with heads 15, nuts 14 and washers 16. These bolts are of such a length as to be capable of being inserted between the members 4 and 5 of each pair in the series of lugs projecting from the outer periphery of the mold members 1 and 2 as well as between the members 6 and 7 of each pair of lugs interiorly formed on these members, and by the use of the washers 16 which extend laterally sufficiently to engage and lap these lugs the two members 1 and 2 are clamped together by the action of drawing up the nuts 14. The mold thus set up is then placed in a vulcanizing heat until the article contained in the mold cavities has been properly cured, after which the bolts are released, the members separated and the vulcanized article removed.

In order to make this device capable of vulcanizing a plurality of articles simultaneously, I employ intermediate sections 17 designed to be interposed between the sections 1 and 2 comprising annular members formed with grooves 18 in their opposite faces similar to the grooves 3 in the faces of the sections 1 and 2 and capable of coöperating registration therewith. The members 17 are also provided with suitable registering grooves 19 to receive the flanges of cores in a similar manner to the grooves 11 of the members 1 and 2 and they also have semi-circular grooves 20 registering with and forming openings in coöperation with the semi-circular grooves 10 of the members 1 and 2. The inner and outer faces of these intermediate sections 17 are provided with circumferentially-formed grooves 21 and 22, respectively, for a purpose to be later described. Extending from either the outer or inner faces or between the grooves 21 and 22 of the intermediate sections 17 are a plurality of preferably radial openings 23 separated from each other by two concentric series of lugs the outer series referred to by the reference numeral 24 and the inner series by the reference numeral 25, the members of each series being preferably arranged in radial alinement with the corresponding members of the other series, the members of each series being placed in annular arrangement with each other, and between the series 24 and 25 is an annular space 26.

Figure 3:
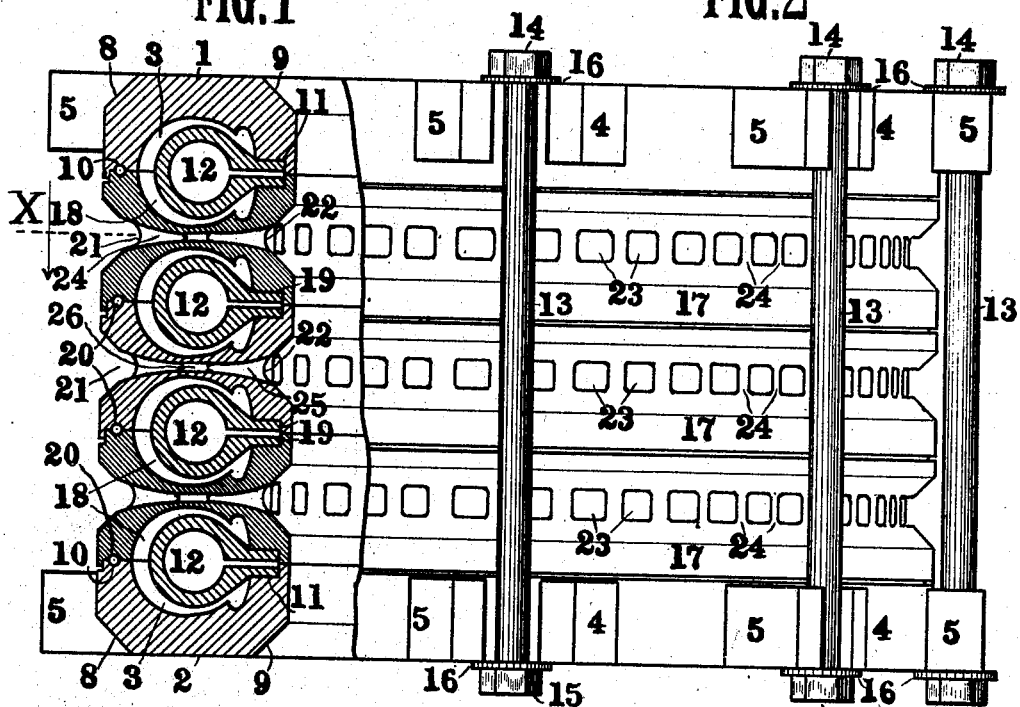

In setting up a mold embodying intermediate sections, such as is illustrated in Fig. 3 of the drawings, the end section 2 will be placed on some suitable support, and an article, such as a tire provided with a core, will be laid in the groove 3. The first intermediate section 17 will then be superposed on the section 2 and positioned thereon by bringing the groove 18 thereof into coöperating registering relation with the groove 3. The groove or semi-mold cavity 18 in the upper face of this section 17 is then properly filled, as has been described with reference to the semi-mold cavity in the member 2. A second section 17 is then superposed on the first section and positioned in the same manner as has been described with reference to the former and this building up of the intermediate sections 17 and the filling of their mold cavities will be carried on indefinitely. When a sufficient number of sections have been nested in this manner the top or upper section is placed on the upper section 17 and positioned with respect thereto by bringing the semi-mold cavity 3 thereof into coöperating registering relation with the corresponding semi-mold cavity 18 in the upper superposed section 17. The entire nest of molds are then clamped together by means of bolts 13, as has been already described with reference to a single cavity mold.

The openings formed by the registering grooves 10 of the sections 1 and 2 and 20 of the sections 17 constitute overflow openings into which surplus material caused by the expansion of the rubber under heat is permitted to escape to relieve undue pressure on the device, but as this is common in the art a further description thereof is believed to be unnecessary.

After vulcanization, the nuts 14 are released, the end section 1 lifted off and the tire contained in the mold cavity thereof removed. The first or upper intermediate section is then removed in a like manner and this is kept up until the entire mold has been emptied.

The grooves 21 and 22 in the intermediate sections and the beveling of the end sections, together with the formation of the openings 23 and 26 through the central portions of the intermediate sections causes the thickness of metal which surrounds each of the mold cavities to be reduced as much as possible, thereby permitting the vulcanizing agent, which is usually steam, to act quickly on the articles contained in the cavities of the mold. The openings 23 and 26 permit the steam to circulate through the medial portions of the intermediate sections 17, thereby bringing it closer to the articles contained in the mold cavities and thus permits it to act quickly on these articles.

It will be seen that the formation of the grooves in and the openings through the medial portions of the intermediate sections 17 constitutes the most important element of this invention for reasons already given, by which said results may be accomplished, when a device constructed in accordance with this invention is employed.

Attention is directed to the fact that the size, depth and cross-sectional configuration of the circumferential grooves 21 and 22, as well as the depth, number and area of the openings 23 may be as shown in the drawings or may be varied as desired and still be within the scope of this invention.

What I claim, is:—

1. A vulcanizing mold comprising a pair of annular end sections having grooves in their opposing faces and an intermediate section adapted to be interposed between said end sections, said intermediate section having annular grooves in its opposite faces registering with the grooves in the faces of said end sections for forming mold cavities, said intermediate section provided with a plurality of transverse openings extending through the body thereof and positioned intermediate the mold grooves therein but spaced apart therefrom, substantially as shown and described and for the purpose set forth.

2. A vulcanizing mold comprising a pair of annular end sections having grooves in their opposing faces, an intermediate section adapted to be interposed between said end sections, said intermediate section having annular grooves in its opposite faces registering with the grooves in the faces of said end sections for forming mold cavities, said intermediate section further provided with circumferential grooves in the outer and inner faces thereof, and a plurality of openings extending between said circumferential grooves to permit the circulation of a vulcanizing agent therethrough, substantially as shown and described and for the purpose set forth.

3. A vulcanizing mold comprising a pair of annular end sections having grooves in their opposing faces, an intermediate section adapted to be interposed between said end sections, said intermediate section further provided with a plurality of transversely-extending openings through the body portion thereof positioned intermediate the mold grooves therein and spaced apart therefrom, the portions of said intermediate section between said transverse openings being formed into a series of lugs by said openings, substantially as shown and described and for the purpose set forth.

4. A vulcanizing mold having as one of its elements a section formed of two portions, spaced apart and provided on the opposite faces with grooves constituting semi-mold cavities, a series of integral lugs extending between said portions, the members of each series of lugs being separated from adjoining members by openings extending therebetween, substantially as shown and described and for the purpose set forth.

5. A vulcanizing mold having as one of its elements a section formed of two portions, spaced apart and provided on the opposite faces thereof with grooves constituting semi-mold cavities, a plurality of concentric series of integral lugs extending between said portions, the members of each series of lugs being spaced from adjoining members in said series and from the members of adjoining series by openings extending therebetween, substantially as shown and described and for the purpose set forth.

In testimony whereof I have hereunto set my hand in presence of two subscribing witnesses.

JOHN K. WILLIAMS.

Witnesses:
C. E. HUMPHREY,
GLENARA FOX.